United States Patent [19]
Kramer

[11] Patent Number: 5,115,577
[45] Date of Patent: May 26, 1992

[54] METHOD AND APPARATUS FOR DRYING OF MATERIAL ESPECIALLY PLASTIC GRANULES

[75] Inventor: Walter Kramer, Cham, Switzerland

[73] Assignee: Motan Plast-Automation AG, Cham, Switzerland

[21] Appl. No.: 604,902

[22] Filed: Oct. 26, 1990

[30] Foreign Application Priority Data

Oct. 28, 1989 [DE] Fed. Rep. of Germany ....... 3936008

[51] Int. Cl.$^5$ ................................. F26B 3/00
[52] U.S. Cl. ........................................... 34/31; 34/53; 34/56
[58] Field of Search ............... 34/26, 28, 30, 31, 33, 34/48, 52, 56, 53

[56] References Cited

U.S. PATENT DOCUMENTS

| | | | |
|---|---|---|---|
| 3,256,614 | 6/1966 | Dunbar | 34/31 |
| 3,277,581 | 10/1966 | Towery et al. | 34/31 |
| 4,711,038 | 12/1987 | Uimonen | 34/31 |
| 4,713,893 | 12/1987 | Webb | 34/31 |
| 4,982,511 | 1/1991 | Frei | 34/33 |

*Primary Examiner*—Henry A. Bennet
*Assistant Examiner*—Denise L. F. Gromada
*Attorney, Agent, or Firm*—Robert W. Becker & Associates

[57] ABSTRACT

A method and an apparatus for drying of material, especially of plastic granules, wherein the material disposed in a container is dried by drying air which is adjusted to a drying temperature specific to the material to be dried. The setting of the drying temperature depends on the through put rate of the material. The apparatus comprises at least one container for the material to be dried, a drying duct which opens into a first end of the container, a recycling duct for the drying air that is connected to a second end of the container, and at least one conveying means which is equipped with a valve that may be actuated for conveying the material. The valve is connected to a control unit.

4 Claims, 2 Drawing Sheets

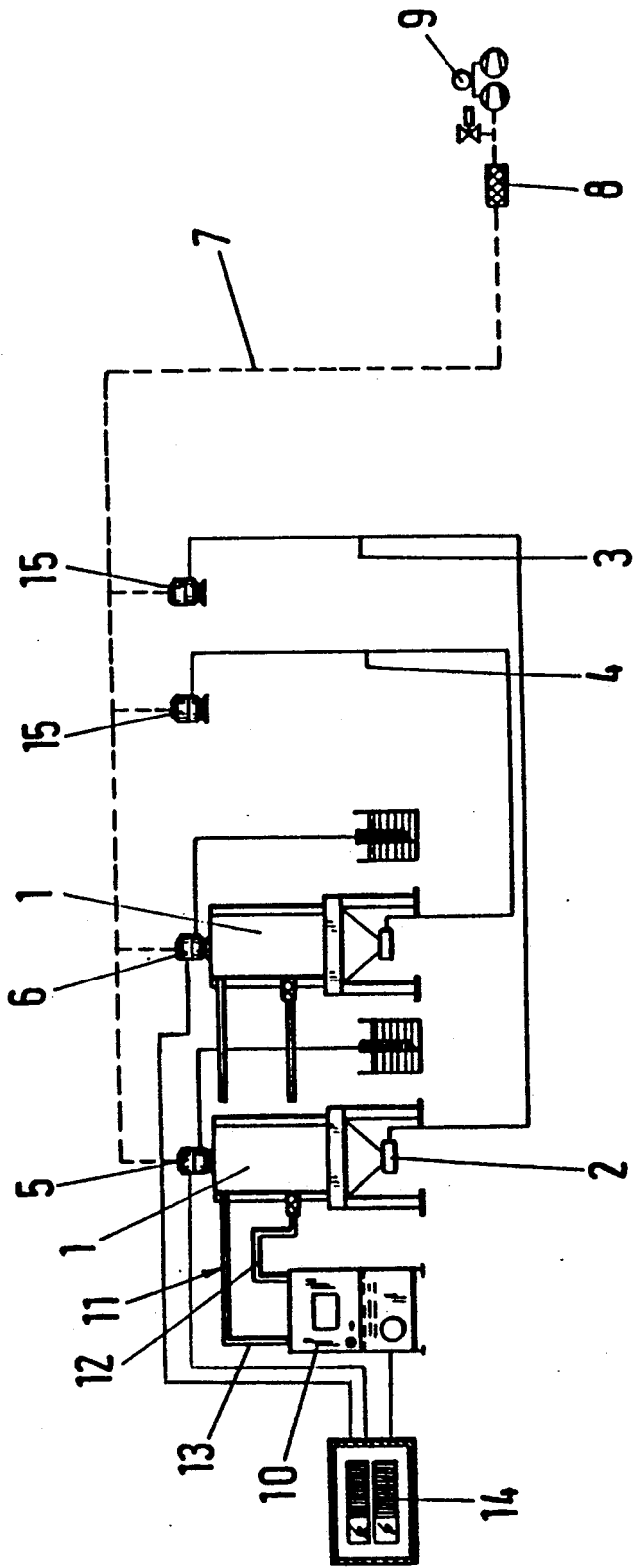

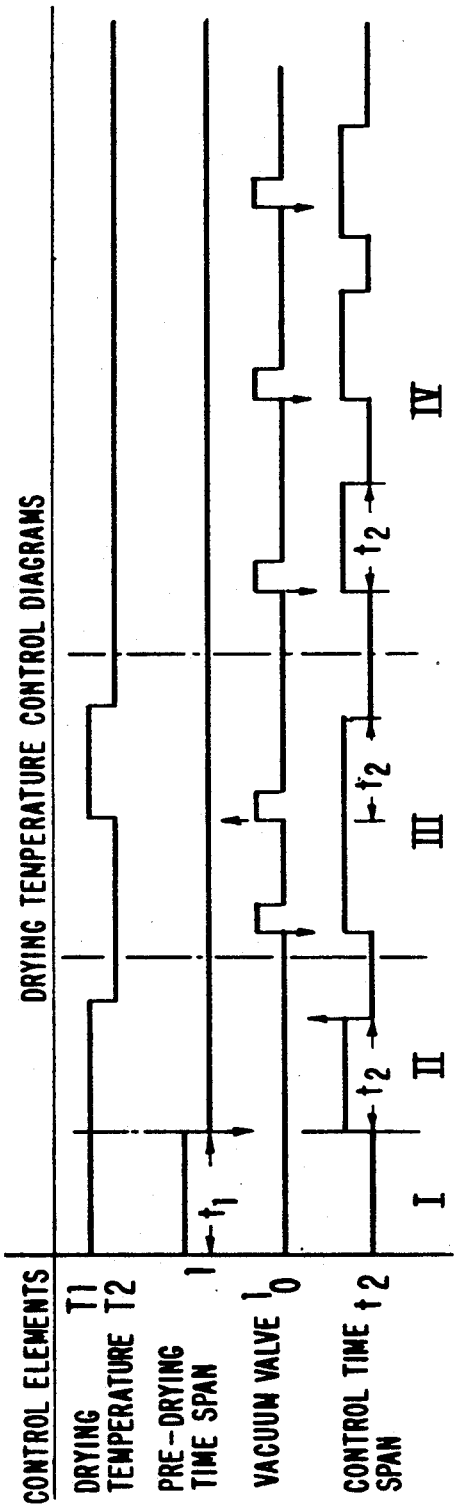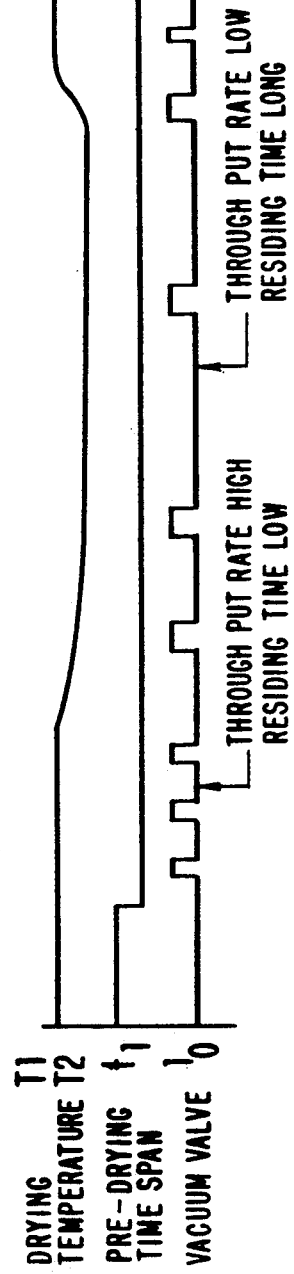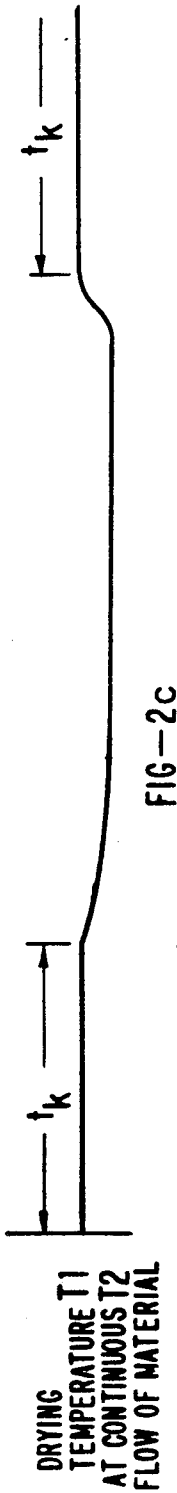

METHOD AND APPARATUS FOR DRYING OF MATERIAL ESPECIALLY PLASTIC GRANULES

BACKGROUND OF THE INVENTION

The present invention relates to a method for drying of material, especially of plastic granules, wherein said material disposed in a container is dried by drying air which is adjusted to a drying temperature specific to said material to be dried.

It has been known that thermoplastic materials are more or less hygroscopic. The absorbed moisture, usually stemming from the atmosphere, may cause technical and manufacturing problems during the plasticizing process of plastic granules and also reduce the quality of the processed material due to enclosed water vapor. Therefore, most thermoplastic granules are dried by drying air and with varying energy expenditures. The drying capacity depends on the initial and the final moisture and on the through put rate of the drying chute. In order to avoid problems during the drying process due to varying properties of the thermoplastic materials, different drying conditions are required so as not to damage the thermoplastic material. Especially the new so-called "high-tech" plastics now introduced to the market are very sensitive and the borderline between optimally drying and damaging or altering the material is very narrow. The damages or alterations, for example, the excretion of additives or the destruction of the polymer network, result from extended drying periods and/or drying temperatures chosen too high. The quality and the required time of the drying process are a function of the dew point, the air flow, the drying time and the drying temperature.

It has been known to adjust the drying process for plastic granules by adjusting the air flow. Plastic granules that have been heated once maintain their drying temperature even when the air flow is reduced as long as the heat loss of the material is not greater than the energy introduced by the reduced air flow. A natural cool-down of the granules is not desired and the drying chute should be well insulated in order to conserve energy. Since the drying temperature is maintained at a constant level even though the air flow is reduced, damage to the plastic granules is almost inevitable.

It is therefore an object of the present invention to provide a method and an apparatus of the aforementioned kind that ascertains a reliable and energy conserving drying of the material without damaging the material.

BRIEF DESCRIPTION OF THE DRAWINGS

This object, and other objects and advantages of the present invention, will appear more clearly from the following specification in conjunction with the accompanying drawings, in which:

FIG. 1 is a schematic representation of an apparatus of the present invention for the drying method of the present invention; and FIG. 2a-c show diagrams representing three possible variations of the method of the present invention.

SUMMARY OF THE INVENTION

The method of the present is primarily characterized by controlling the drying temperature depending on the through put rate of the material. The apparatus of the present invention is primarily characterized by a valve of the conveying means that is connected to a control unit.

In the method of the present invention the drying temperature is used as a control parameter, since for a constant dew point, a constant filling level of the container (drying chute) and at a constant air flow the temperature may easily be adjusted and controlled according to the through put rate of the material at a respective time. Thermal damages of the material may be prevented in an easy manner with respect to the resulting through put time spans for the passage of the container. When the through put rate of the material is low, the time for the passage of the material through the container is longer so that the drying temperatures may be decreased. Thereby thermal damages of the material may be reliably avoided even for extended residing times in the container. By employing the method of the present invention energy is conserved and costs are reduced.

In the apparatus of the present invention the valve of the conveying means is connected to the control unit. When the valve is switched on, i.e., the material is removed from the container and replaced by new material, the temperature is lowered by the control unit until the through put rate of the material is increased again and an increase of the drying temperature for a sufficient drying of the material is necessary. In this manner, thermal damage to the material to be dried is most certainly prevented.

DESCRIPTION OF PREFERRED EMBODIMENTS

The present invention will now be described in detail with the aid of several specific embodiments utilizing FIGS. 1 and 2a-c.

FIG. 1 represents a drying apparatus in a schematic drawing, which may be used for drying piece goods, especially granules. For example, thermoplastic materials may be dried without problems with this apparatus. The granules are kept in two containers or silos 1, which are fed from storage bins and each have an outlet port 2 which is connected via an outlet duct 3 or 4 to processing machines (not represented). The suction conveying means 15 of the processing machines are shown in FIG. 1. The processing machines are, for example, plasticizing machines which plasticize the plastic granules. On top of each of the silos 1 there is one respective conveying means 5 or 6 provided which serves for feeding the material from the storage bins into the silos. In this specific embodiment the conveying means is a suction conveying device. Both suction conveying devices 5, 6 are connected to a blower 9 via a blower duct 7, whereby a filter 8 is disposed between the blower 9 and the suction conveying devices 5, 6. A control unit 14 is connected to the valves of the conveying devices 5, 6 and a drying device 10.

The drying device 10 of the drying apparatus includes at least one heating means, at least one drying cartridge and one blower arranged in a known manner. The blower, the drying cartridge and the heating means are arranged in a closed system 11. The closed system comprises a drying duct 12, in which the drying cartridge and the heating means are disposed and which has one outlet opening into each of the silos 1 through which the drying air is introduced to the bottom of the silos 1. While passing through the material to be dried, the drying air then ascends from the bottom to the top of the silos 1 where it departs via a recycling duct 13.

The drying air laden with moisture is then recycled to the drying device 10. Preferably, the blower of the drying device 10 is disposed in the recycling duct 13. The blower blows the drying air into the silos 1 and sucks it out of them via the recycling duct 13. The drying duct 12 and the recycling duct 13 may be arranged such that the individual silos may be dried independently. For this purpose respective switch valves are disposed in the drying and in the recycling duct.

The moisture is removed from the drying air with the aid of the drying cartridge. The heating means subsequently heat the drying air to the optimal drying temperature required for the drying of the material contained in the silos 1.

The material is removed from the silos 1 via the respective outlets 2 and conveyed to the processing machines The same amount of material that is being removed from the outlet 2 is replaced by the conveying means 5, 6 with new material. Thereby the silos 1 are maintained at a constant filling level. In order to avoid overheating of the material, the temperature is adjusted according to the through put rate of the material. This will be demonstrated with the aid of three embodiments represented in FIG. 2a-2c. It is presumed that the dew point, the filling level of the silos 1 and the air flow remain constant. The drying temperature which is the control parameter may then be adjusted to the through put rate of the material at the present time. Thereby thermal damage of the material may be prevented with respect to the time the material resides in the silos 1. When presuming that the dew point and the through put rate of the drying air through the silos 1 are maintained at a constant level, a short drying time is achieved at the maximum drying temperature of the material to be dried. On the other hand, lower drying temperatures require a longer drying time. By monitoring the actual through put rate of the material, the drying temperature is adjusted. However, it has to be taken into account that each plastic material must have a maximum drying temperature and a minimum drying time.

In the following paragraphs the through put of the drying apparatus is monitored presuming that a suction conveying device is employed.

FIG. 2a represents a first embodiment of the present invention. At the start of the drying process, the material is pre-dried (cf. section I of FIG. 2a) at the drying temperature T1 during the drying time span $t_1$. When the drying time span $t_1$ has elapsed the actual controlling step (section II) begins and the controlling time span $t_2$ is started. When during this time span the vacuum valve in the conveying means 5, 6 is not activated, i.e., no material is replaced in the silos 1, the drying temperature T1 is lowered to T2 after the controlling time span $t_2$ has elapsed. In this example, it is assumed that no such suction step has taken place and the drying temperature has been lowered to T2. The vacuum valve is in its 0 position. The drying air may then be dried at the lower drying temperature, because no new material has been introduced into the silos.

In section III of FIG. 2a, it is presumed that the vacuum valve of the conveying means 5 or 6 has been opened twice (position I) in order to refill the silo 1. As soon as the vacuum valve is opened (position I) the control time span $t_2$ is restarted. When during this time span the vacuum valve is activated again, as presumed in the current example, the control time span $t_2$ is restarted at the moment of opening the vacuum valve. At the same time the drying temperature is increased from the lower value T1 to the higher value T2. This is necessary because during the given control time span $t_2$ the silo 1 has been refilled with enough material so that an increase in the drying temperature is made necessary in order to dry the material at an optimal temperature without damaging the material. When during the given control time span the vacuum valve has been opened only once, the drying temperature must not be raised to the setting T1, because, for an optimal drying of the material in the silos 1, it is sufficient to have the temperature at the lower setting T2. In section III no further filling step is carried out during the newly started control time span $t_2$, i.e., the vacuum valve is not opened, and the drying temperature is again decreased to the lower value T2 after the control time span $t_2$ has elapsed.

In section IV of FIG. 2a, the vacuum valve is opened three times, whereby the time span between the individual opening events is greater than the control time span $t_2$. Therefore, the drying temperature remains at the lower setting T2. There is no need for raising the temperature to T1. After each opening of the vacuum valves the control time span $t_2$ is restarted (cf. FIG. 2a).

In summarizing the above, it may be said that the control time span $t_2$ is started by the vacuum valve of the conveying means 5, 6. The length of the control time span $t_2$ depends on the kind of the material, on the through put rate of the drying air through the silo and the through put rate of the material. An optimized drying of the material is achieved via the control time span $t_2$. When during the control time span $t_2$ the vacuum valve is not opened, the drying temperature is reduced to the lower setting T2 after the control time span $t_2$ has elapsed. However, when the vacuum valve is opened during the control time span $t_2$, then the control time span $t_2$ is started again and the drying temperature is reset to the higher value T1.

In FIG. 2b, a second embodiment of the drying temperature control is represented. The material is first pre-dried at a drying temperature T1 during a time span $t_1$, while the vacuum valve is closed (position 0), as in the previous example. After the pre-drying time span $t_1$ has elapsed, the temperature T1 is maintained. In the example represented, the vacuum valve of the suction conveying device 5 or 6 is then opened three times in short intervals. This means that a large amount of material is being removed from the respective silos. The drying capacity in this case is high and the time the material stays in the silo is short. Therefore the drying temperature is not reduced so that the material is dried sufficiently, even during the short time span it is residing in the silo.

When no material is removed over a longer time period, the drying temperature is decreased to the lower temperature setting T2. In contrast to the previous example the temperature decrease is carried out continuously. The drying temperature may be lowered, because the conveying capacity of the suction conveying means is low and the material stays in the silos 1 for an extended period of time. The material is therefore sufficiently dried, and damage to the material is not to be expected due to the low drying temperature T2.

As long as only small amounts of material are removed from the silo 1 and only small amounts of material are replaced, the temperature may remain at the lower setting. When the vacuum valve of the suction conveying means 5 or 6 is opened for longer time spans and/or in shorter intervals, the drying temperature is again increased to the setting T1. This temperature increase is again carried out continuously, in contrast to the previous example, in which the drying temperature is lowered or raised more or less discontinuously.

In FIG. 2c, there is also the possibility demonstrated to remove the material not in a discontinuous but in a continuous fashion over a longer time period. In the area $t_k$ the vacuum valve of the conveying means 5 or 6 is opened so that material is continuously removed and replaced by new material. During this time, the drying temperature remains at the higher value T1 in order to sufficiently dry the material.

When the removal of material is reduced to 0 in a continuous or discontinuous manner, the drying temperature is reduced continuously to the lower setting T2.

The control system for drying of material of the present invention is advantageous in many respects. The drying temperature is lowered when the through put rate of the material is low, so that the material to be dried in the silo 1 is not thermally damaged. If at a low through put rate of the material the higher drying temperature, which is acceptable for the initial drying, were maintained, the material would be thermally damaged due to the lower through put rate and the resulting longer residing time of the material in the silo 1. This is reliably prevented by the control system of the drying temperature according to the present invention. Also, by precalculating the stepwise temperature reduction for a lowered through put rate of the material, i.e., longer drying times, energy may be saved to a large extent. The drying apparatus of the present invention may be operated and controlled in a fully automated manner. In a drying apparatus constructed according to the newest technical standards including micro processor control units (computer assisted control units) the necessary additional investments are of relatively low costs. Depending on the size of the apparatus, the costs for the respective control units may usually be amortized by the energy conservation alone within a year, without even contemplating the better quality of the dried material.

In a further embodiment of the present invention the through put rate of the material in the silos (drying chutes) 1 may also be determined by devices that are disposed before or after the silos without any changes to the control system described above.

The present invention is, of course, in no way restricted to the specific disclosure of the specification, examples and drawings, but also encompasses any modifications within the scope of the appended claims.

What I claim is:

1. A method for drying of material, wherein said material disposed in a container is dried by drying air which is adjusted to a drying temperature specific to said material to be dried, said method including the step of:

controlling said drying temperature depending on a through put rate of said material;

recycling said drying air through said material to be dried and through a means for heating said drying air;

starting a control time span upon initiation of a refilling step of said container with said material;

restarting said control time span when a further refilling step occurs and increasing said drying temperature; and adjusting said drying temperature to a lower setting after said control time span has elapsed.

2. A method according to claim 1, including the step of lowering said drying temperature when longer drying intervals are employed.

3. A method according to claim 1, including the step of lowering said drying temperature when said through put rate of said material is reduced.

4. A method according to claim 1, including the step of controlling said drying temperature within a given control time span.

* * * * *